(12) United States Patent
Strobl et al.

(10) Patent No.: US 10,767,643 B2
(45) Date of Patent: Sep. 8, 2020

(54) METHOD OF PUMP OPERATION, USE OF THE METHOD IN HPLC, PUMP, PUMP SYSTEM, AND HPLC SYSTEM

(71) Applicant: DIONEX SOFTRON GMBH, Germering (DE)

(72) Inventors: Christoph Strobl, Munich (DE); Michael Haeckel, Germering (DE); Stefan Seitz, Germering (DE)

(73) Assignee: Dionex Softron GmbH, Germering (DE)

( * ) Notice: Subject to any disclaimer, the term of this patent is extended or adjusted under 35 U.S.C. 154(b) by 266 days.

(21) Appl. No.: 16/027,554

(22) Filed: Jul. 5, 2018

(65) Prior Publication Data
US 2019/0010940 A1 Jan. 10, 2019

(30) Foreign Application Priority Data
Jul. 7, 2017 (DE) .................. 10 2017 115 242

(51) Int. Cl.
*F04B 49/20* (2006.01)
*G05D 7/06* (2006.01)
(Continued)

(52) U.S. Cl.
CPC .......... *F04B 49/20* (2013.01); *F04B 11/0058* (2013.01); *F04B 49/065* (2013.01);
(Continued)

(58) Field of Classification Search
CPC .. G01N 2030/326; G01N 30/32; G01N 30/22; G01N 30/36; G01N 2030/324;
(Continued)

(56) References Cited

U.S. PATENT DOCUMENTS 4,225,290 A 9/1980 Allington
4,681,513 A 7/1987 Saito et al.
(Continued)

FOREIGN PATENT DOCUMENTS

CN 103512986 A 1/2014
CN 103814292 A 5/2014
(Continued)

OTHER PUBLICATIONS

Choikhet et al., "The physicochemical causes of baseline disturbances in HPLC, part I—TFA-containing eluents," LC GC Europe, 16(2), 96, 98-100, 102, 103-105, 2003.

*Primary Examiner* — Dominick L Plakkoottam (57) ABSTRACT

The present invention relates to a method of operating a pump generating a flow of a fluid with a pressure, the method comprising operating the pump with a pump speed S satisfying the equation $S=S_{simple}(1+COR(t))$; wherein S is the pump speed, $S_{simple}$ is the pump speed disregarding any compression and/or expansion of the fluid, t is a time, and $COR(t)$ is a time dependent correction function; wherein the time dependent correction function $COR(t)$ is a product of a corrective amplitude $A_{cor}$ and a time-dependent function $f(t)$, i.e., $COR(t)=A_{cor} \cdot f(t)$; and wherein the corrective amplitude Acor is set based on a measure for the flow and a measure for the pressure. The present invention also relates to a corresponding use, a pump, a pump system and an HPLC system.

16 Claims, 4 Drawing Sheets (51) Int. Cl.
*G01N 30/36* (2006.01)
*F04B 49/06* (2006.01)
*F04B 11/00* (2006.01)
*G01N 30/32* (2006.01)

(52) U.S. Cl.
CPC .............. *G01N 30/32* (2013.01); *G01N 30/36* (2013.01); *G05D 7/0676* (2013.01); *F04B 2205/04* (2013.01); *F04B 2205/09* (2013.01); *F04B 2207/042* (2013.01); *G01N 2030/326* (2013.01)

(58) Field of Classification Search
CPC ...... F04B 49/20; F04B 23/06; F04B 11/0058; F04B 2205/04; F04B 2205/09; F04B 2207/042; F04B 49/065; G05D 11/132; G05D 7/0676
See application file for complete search history.

(56) References Cited

U.S. PATENT DOCUMENTS

| | | | |
|---|---|---|---|
| 4,752,385 A | 6/1988 | Wilson | |
| 4,797,207 A * | 1/1989 | Honganen | B01D 15/163 |
| | | | 210/101 |
| 5,108,264 A * | 4/1992 | Abdel-Rahman | F04B 11/0075 |
| | | | 417/20 |
| 8,140,274 B2 * | 3/2012 | Gagel | F04B 43/1253 |
| | | | 702/45 |
| 9,624,923 B2 * | 4/2017 | Ruegenberg | F04B 23/06 |
| 2004/0251203 A1 | 12/2004 | Zelechonok | |
| 2010/0143155 A1 * | 6/2010 | Preiswerk | F04B 1/02 |
| | | | 417/1 |
| 2010/0275678 A1 | 11/2010 | Herzog et al. | |
| 2013/0336803 A1 | 12/2013 | Ruegenberg et al. | |
| 2014/0193275 A1 * | 7/2014 | Strobl | G01N 30/36 |
| | | | 417/12 |
| 2015/0346168 A1 * | 12/2015 | Ciavarini | G05D 11/132 |
| | | | 73/61.56 |
| 2018/0274531 A1 * | 9/2018 | Yanagibayashi | F04B 49/065 |

FOREIGN PATENT DOCUMENTS

| | | |
|---|---|---|
| CN | 104101658 A | 10/2014 |
| EP | 1707958 B1 | 10/2006 |
| GB | 2433792 | 7/2007 |
| GB | 2446321 | 8/2008 |
| WO | 2017090148 A1 | 6/2017 |

* cited by examiner

METHOD OF PUMP OPERATION, USE OF THE METHOD IN HPLC, PUMP, PUMP SYSTEM, AND HPLC SYSTEM

CROSS-REFERENCE TO RELATED APPLICATION

This application claims the priority benefit under 35 U.S.C. § 119 to German Patent Application No. DE 10 2017 115 242.3, filed on Jul. 7, 2017, the disclosure of which is incorporated herein by reference.

FIELD OF INVENTION

The present invention relates to the operation of a pump, particularly for high performance liquid chromatography (HPLC), to a corresponding use in a HPLC method, a corresponding pump and pump system, and a corresponding HPLC system.

BACKGROUND

While the invention will be described with a particular focus on HPLC, it is not necessarily limited to this application. In HPLC (and also in other applications), pumps are used to generate a flow of a fluid (e.g., a liquid) with a pressure. Such pumps are supposed to convey a flow in the low-pulse to pulse-free range at high pressure. What is used for this purpose are pumps that work based on the displacement principle with pistons having a cyclical effect. For bridging the suction period, pumps with a first and a second head/pair of pistons are used. Both heads can be arranged in parallel with regard to fluidics, so that one piston is always conveying while the other one is suctioning. Such an arrangement is described in U.S. Pat. No. 4,752,385 A, for example. As an alternative, the two heads can also be arranged in series, so that the second piston is conveying when the first one is suctioning, and that the first piston is conveying when the second one is sucking while at the same time being filled by the first piston. Such an arrangement is described in U.S. Pat. No. 4,681,513 A, for example.

Figure 1:
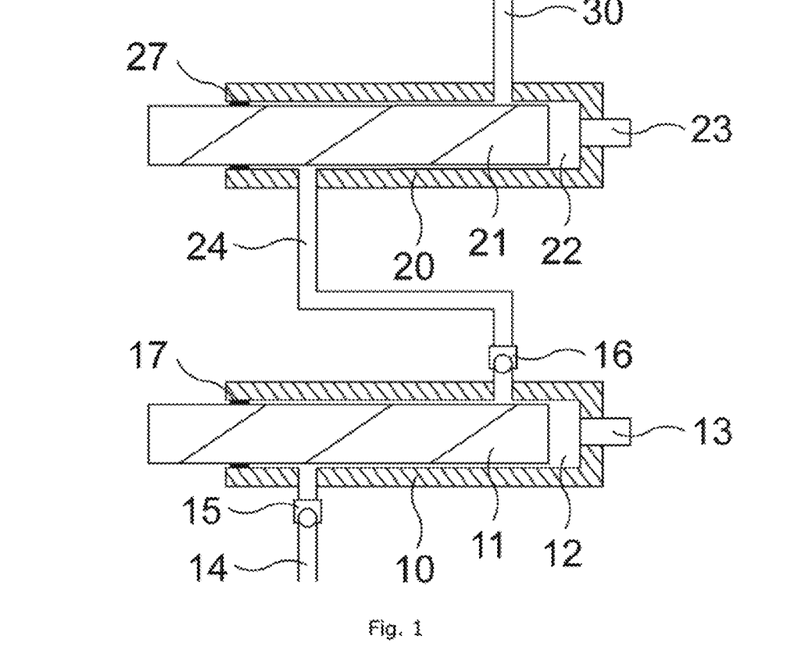
FIG. 1 depicts a pump.

One problem to be solved will be described in the following based on the example of a serial double piston pump (while it is noted that the present invention is not limited thereto, but may also comprise other embodiments). FIG. 1 shows a serial double piston pump in a schematic rendering. It comprises a working head 10 inside of which a movable working piston 11 is located. The sealing against the outside is provided by means of a seal 17. The working head has an inlet valve 15 and an outlet valve 16 that are switched in such a manner that the liquid can be sucked in via an inlet connection 14, and that it can be passed on via a connection capillary 24. A pressure sensor 13 can be arranged inside the pump head of the working head in order to determine the pressure in the interior of the working head. The free volume 12 in the interior of the working head can be decreased by the forward displacement of the working piston 11, i.e. in the right direction of the image, or can be increased by a backward movement, i.e. in the left direction of the image. The drive that is necessary for this purpose is not shown in the Figure to providing a clearer illustration. Further, there is a compensation head 20 with a balance piston 21, a seal 27, a free volume 22, and a pressure sensor 23. The compensation head is connected to the connection capillary 24 and to an outlet capillary 30 which provides the conveyed liquid for the HPLC system in a direct manner without any valves. Because the connection capillary 24, the compensation head 20 and the outlet capillary 30 are directly connected to each other, the same pressure is respectively present in these parts, which in the following will be referred to as the system pressure.

The shown components merely serve as examples for explaining the invention. The application to further embodiments will be described below.

The shown pump usually works in a cyclical manner in order to create a continuous flow at the exit. In a first phase of the pump cycle that is referred to as the suction phase, the working piston 11 moves backward and suctions in liquid from the solvent reservoir while the balance piston 21 moves forward, thus maintaining the flow at the pump exit and/or the system pressure. During this procedure, the inlet valve 15 is opened and the outlet valve 16 is closed. The suction phase ends shortly before the balance piston reaches the front end of its duty stroke and thus cannot convey any more liquid.

In a second phase that is referred to as the pre-compression phase, the working piston 11 moves forward to bring the previously suctioned-in liquid to the same high pressure as the one that is present at the pump exit and in the free volume 22 of the compensation head. In the course of this process, the inlet valve 15 closes, with the outlet valve 16 also remaining closed for the time being. This process is referred to as pre-compression, since the liquid has to be regarded as being compressible at the high pressures that are usual in HPLC. During the pre-compression, the balance piston 21 continues to maintain the flow and/or system pressure. The pre-compression phase ends when the pressure in the working head 10 reaches the system pressure, so that the outlet valve 16 opens and both free volumes 12 and 22 are connected to the outlet capillary 30. During the pre-compression phase, the working piston travels the length of the pre-compression path, which depends on the compressibility of the liquid as well as on the pressure inside the compensation head.

In a subsequent third phase (which may be referred to as the conveying phase), the outlet valve 16 is opened, so that the movement of the balance piston 21 as well as of the working piston 11 contributes to the total flow that is provided at the pump exit. In order to avoid an undesired increase of the total flow, the piston speeds have to be accordingly adjusted in such a manner that what results in sum at the pump exit is the desired total flow again. The exact manner in which this occurs depends on the specific technical realization of the pump. In any case, the balance piston 21 must be pulled back in time before the beginning of the next pump cycle or the next suction phase in order to refill the compensation head. In pumps according to the state of the art, this is done either in the third or in an additional fourth phase. When it comes to understanding the invention, it is noted that the flow provided at the pump exit in the third and, where applicable, in the fourth phase depends on the sum of the two piston speeds (with the correct algebraic sign). In the following, the phases following the pre-compression phase are referred to in a generally summarized manner as the conveying phase, independently of any specific technical realization.

The above explanations serve merely for providing an understanding of the invention and are only meant to explain the general working principle of pumps. However, the use of the invention is not limited to the described realization, while it is carried out in such a pump or pump system in some embodiments.

One problem arises as a result of the fact that, during the pre-compression, compression work is applied to the fluid/ liquid which is present in the free volume 12 of the working head 10, which leads to this fluid/liquid being heated. This compression work is the greater the higher the pressure and the compressibility of the liquid. Thus, after pre-compression, the pre-compressed liquid inside the working head 10 is warmer than the working head 10 and the working piston 11.

No further compression work is performed following pre-compression, since the pressure in the free volume 12 remains substantially constant after the outlet valve 16 is opened. The previously heated liquid cools off especially at the beginning of the conveying phase due to the contact with the surrounding structural components of the pump, so that its volume and/or pressure changes.

This volume contraction decreases the flow that is provided at that time, which leads to a temporary drop in the provided flow. This is repeated with every pump cycle, and in total manifests as an undesired periodic flow error of the pump. With high pressure gradient pumps (HPG), in which different solvents of multiple individual pumps are mixed, such pulsations additionally manifest as fluctuations of the solvent composition. All these effects lead to a deterioration of the chromatographic reproducibility, which represents an important criterion for the quality of a chromatography system, and they corrupt the signal-to-noise ratio of the detection unit of the chromatography system.

SUMMARY

It is an objective of the present invention to avoid or to strongly reduce such flow errors that are caused by the thermal effects. It is desirable that this is carried out in an automated manner. Preferably, the improvement according to the invention is achieved with existing pumps without any modification or extension of the hardware.

Figure 2:
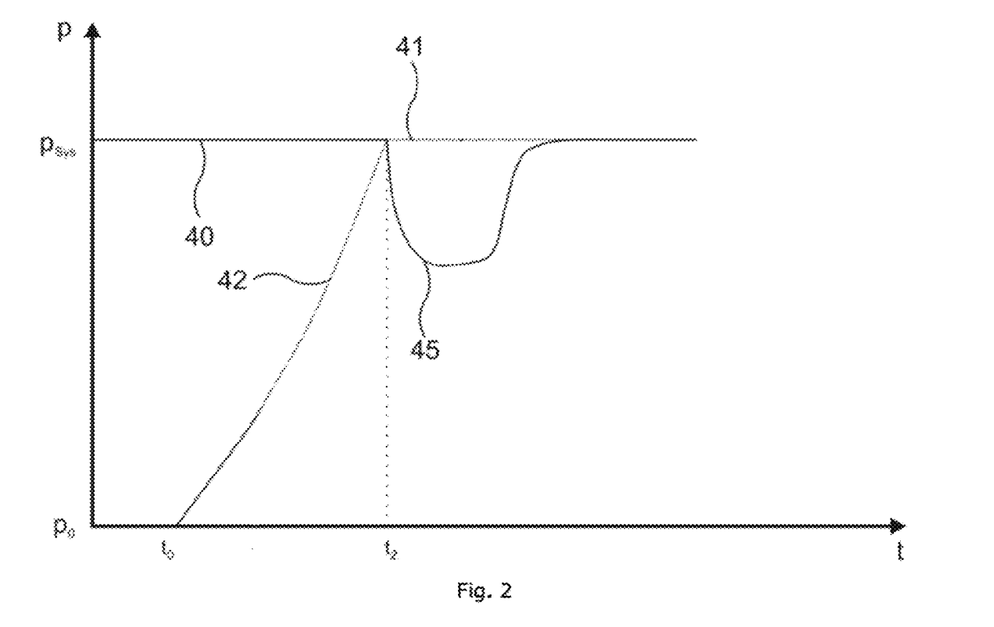
FIG. 2 depicts a schematic view of pressure signals over time.

FIG. 2 shows, as a function of time, the typical pressure profile in the working and compensation head during pre-compression as well as shortly before and after the same. In this example, the non-linear deviation of the pressure profile 42 in the working head is shown in an exaggerated manner.

Up to the point in time t0, the pump is in the suction phase. During this phase, the pressure in the working head corresponds to the ambient pressure or zero, and thus coincides with the time axis. The system pressure $p_{Sys}$ is assumed to be constant in this example, which is indicated by the line 40 (however, this is for simplicity only and the present invention is not limited to such configurations).

The pre-compression phase begins at the point in time $t_0$. At this point in time, a well-defined amount of liquid is present in the volume 12 of the working head, and both valves 15 and 16 are closed. From this point on, the liquid in the working head is compressed.

Due to the forward movement of the working piston 11 into the cylinder 10 (see FIG. 1), the volume 12 is compressed. As a result of the volume decrease that is caused by the forward movement of the working piston 11, the pressure in the working piston 10 increases. The result is a pressure profile 42 as it is shown in FIG. 2, for example. At the point in time $t_2$, the pressure inside the cylinder 10 reaches the system pressure $p_{Sys}$. At that point in time $t_2$, the outlet valve 16 is opened and the conveying phase begins. The overlapping of the two piston movements of the working piston 11 and the balance piston 21 is supposed to result in a constant flow before and after the point in time $t_2$. Since compression work is always being applied to the liquid in the volume 12 during pre-compression, a thermal imbalance is created. With the end of pre-compression, no further compression work is applied to the liquid in volume 12. The excess heat from the thermal imbalance flows outwards via the material of the cylinder 10 by means of thermal conduction. As a result, a contraction of the liquid in the volume 12 occurs. Due to the time dependence of this process, this is accompanied by a negative flow component that is superimposed on the flow due to the movement of the working piston 11 and the balance piston 21. This results in the pressure profile 45. To avoid a flow error due to the mentioned negative flow component, it must be achieved that the pressure profile equals (or approximates) the straight line 41, because in that case no flow error is present.

This may be particularly advantageous in HPLC methods and systems comprising more than one pump. In some HPLC applications, a plurality of pumps may be used to supply a plurality of different fluids (e.g., solvents) to a separation column. That is, in such HPLC systems/methods, different solvents are supplied by different pumps, and the solvents are subsequently mixed. The mixing ratio may be varied by running the pumps at changing speeds. In HPLC analytics, there are methods of analysis in which a mixing gradient of water ($H_2O$) is run against acetonitrile (ACN or MeCN or $C_2H_3N$). Trifluoroacetic acid (TFA or $CF_3COOH$) may be added to the two liquids water and ACN. In analyses with TFA, absorption detectors may be used to measure the analytes. In addition, the absorption of the UV signal is measured. The size of the absorption represents a measure for the amount or concentration of the analytes. In order to provide an exact determination of the analytes, it is necessary for the UV absorption to have a good signal-to-noise ratio. Disturbances in UV absorption make the exact determination of the substance amounts of the analytes more difficult. An absorption manifests in an erratic temporal progress of UV absorption.

The added substance TFA allows for an improved measurement of some of the analytes. A disadvantage of the use of TFA is that TFA itself also absorbs in the UV spectrum. Variations in the concentration of TFA in the water or ACN or in the mixture of water and ACN lead to fluctuations in UV absorption. These fluctuations have a negative impact on the determination of the substance amount as well as on the substance identification. Therefore, an even distribution of the concentration of TFA is necessary to be able to exactly determine the analytes by means of a UV absorption detector. TFA has the characteristic to react to errors of the otherwise even pump flow by producing concentration fluctuations (see, e.g., K. Choikhet, B. Glatz and G. Rozing, The Physicochemical Causes of Baseline Disturbances in HPLC, Part I—TFA-Containing Eluents, LC GC Europe, February 2003).

As discussed, in a phase where the fluid/liquid is compressed, it is heated. Once the liquid is delivered to other components, the liquid cools down (e.g., by means of heat conduction). Thus, its volume is reduced, leading to a decreased flow compared to the case when the liquid would not cool down. The reduced flow may have negative effects on subsequent analyses. Some attempts have been made to account for this.

Patent GB 2446321A describes a method where the cooling process is transferred to a point in time when no disturbance effects are to be expected. For this purpose, a sufficiently long waiting period is integrated into the pre-compression phase after approximately 90-95% of the pre-compression to let the liquid cool off again. Because the outlet valve is still closed at this point in time, the volume contraction does not impact the flow or the pressure that is provided at the pump exit. After the cool-off, the rest of the pre-compression is carried out, and the liquid is pumped into the system in a thermally equilibrated manner.

A disadvantage of this solution is that a certain minimum waiting period is required, since the duration of the cool-off is mainly determined by the thermal conduction of the material of the piston chamber and the liquid. To avoid the problem, it must be determined in such a manner that the liquid cools off to a sufficient degree even under unfavorable circumstances. This waiting period prolongs the pre-compression phase and thus the cycle time of the pump. Consequently, the maximal flow rate of a pump is decreased. Further, a measurement of the pressure inside the working head is an absolute necessity in this solution, which means additional effort. Besides, this solution can only be used if the drives for the working and balance pistons are independent, which results in additional effort, as well.

US 2010/0275678A1 describes a method including a pressure controller which is meant to compensate pressure drops by means of correspondingly superimposed piston movements. For this purpose, the temporal development of the pressure at the pump exit is acquired already before the expected pressure drop, i.e. for example in the suction phase and/or in the pre-compression phase, and based thereon an expected pressure profile is calculated in a time window at the beginning of the conveying phase. Subsequently, a pressure controller is activated at the beginning of the conveying phase, regulating the piston speeds in a certain time interval, namely in such a manner that the actual pressure profile corresponds to the expected one. A disadvantage of this solution is that the pressure control is sensitive to external disturbances, i.e. to deviations from the expected pressure profiles that are induced from the outside. In an HPG arrangement, these may be caused by the other pump, for example. This must be avoided by a synchronization of the individual pumps, so that the method cannot be applied to commonly used HPG pumps with a dependent camshaft drive.

Also in patent GB2433792 B, the compensation of pulsations by a pressure controller following pre-compression is described. As for its basic idea, this patent corresponds to the above-mentioned application document US2010/0275678A1. What is additionally suggested is the insertion of a flow resistance between the working and the compensation head in order to decouple the pressure inside the working head from the pressure inside the compensation head. This solution has the already described disadvantages, and the use of an additional flow resistance has the additional disadvantage that its effect strongly depends on the respectively set pump flow.

EP 1707958 B1 describes a general state of the art. This patent relates to syringe pumps as they are used for low flow rates. They work only with one single piston/head per solvent. EP 1707958 B1 is concerned with the problem that changes in the pressure or the ambient temperature lead to a deviation in the provided flow, which leads to undesired oscillations when different solvents are used. This effect is to be compensated by correspondingly superimposed correctional piston movements. However, the patent contains no teaching as to how these correctional piston movements are to be determined.

Document DE102011052848 describes a method that makes it possible to obtain the magnitude of the compensation based on the pressure profile during the pump cycle. During pre-compression, the liquid is heated up in the cylinder of the working piston. As a result, the pressure profile during pre-compression increasingly deviates from the case of an isothermal pre-compression depending on the positional angle of the cam. The development of the pressure is measured for a first time in a lower pressure range. The development of the pressure is linearly extrapolated against the positional angle of the cam until the system pressure is reached. The intersection point of the linear extrapolation with the system pressure results in a positional angle of the cam, which represents the point at which the system pressure is reached in the case of isothermal pre-compression. The real positional angle of the cam at which the system pressure is reached is measured, and it stands for the pre-compression at adiabatically influenced conditions. The difference between the isothermal and the adiabatic positional angle of the cam is a measure for the magnitude of the thermal effect, and is also used for determining the compensation value.

The method requires the use of a pressure sensor inside the cylinder of the working piston, so that the pressure profile can be measured during pre-compression. Besides, the substance-dependent change in the compressibility of the liquid inside the cylinder of the working piston from the pressure is neglected in this method. As a result of this physical characteristic, the increase in pressure is not linear with respect to the pressure-dependent volume reduction during pre-compression. Thus, the pressure profile deviates from the expected linear increase in pressure in the case that the compressibility is independent of the pressure. If the pre-compression deviates from the isothermal case, this again results in deviations from the expected linear pressure increase. These two deviations from the linear case cannot be differentiated from each other based on the pressure profile and the knowledge of material parameters. Here, document DE102011052848 must assume that, at higher flows, the deviations from the linear case are mostly due to the adiabatic influencing of the pre-compression, and then neglects the share that is caused by the pressure-dependent compressibility. Further, the development of the pressure increase is also influenced by the reliability of the sealing of the working pistons as well as of the inlet and outlet valve. Should any leakages occur inside them, the data acquisition of the pressure profile will determine different values for the correction variables during pre-compression than if these structural components were tightly sealed. The pressure profile is also falsified if an air bubble is sucked in, so that the correction values cannot be determined.

Furthermore, it has been found that when it comes to a low-pressure gradient pump, a different method is used for determining the pressure profile, because this pump type lacks the pressure sensor inside the cylinder of the working piston. In the case of a low-pressure gradient pump, the development of the system pressure is assessed. After pre-compression, a volume contraction and a flow error occur as a result of the cooling off process. Because during an analysis the pump is pumping against a fluidic with a high flow resistance, pressure is created through the pump flow. If now the flow error occurs after pre-compression, a pressure drop also occurs as a consequence. This pressure drop is detected. The depth of the pressure drop represents the measure for determining the flow error, and thus the correction variable. The relation between the pressure drop and the correction variable is not known, so that the correction variable is determined in an iterative manner. A change in correction variable is measured and applied as a compensation to the pump flow in the following pump cycle. In the new cycle, the effect of the correction variable is detected just like in the previous cycle based on the development of the system pressure after pre-compression. A new deviation from the determined pressure is added to the old determined value as a new change in correction variable. The new value is in turn applied to the next cycle until the correct magnitude has been determined. In that case, the change is zero. If a change in outer conditions occurs, such as for example an exchange of the liquid or an alteration of the pressure, the pump keeps detecting the change of the correction value and adds this change in an iterative manner to the correction value that has been determined in the previous cycle.

This change has the disadvantage that the flow error is detected with the help of a pressure profile. The pressure profile is influenced by the fluidics of the chromatography system. What is provided in the standard case is the use of fluidics that has a relatively large volume with respect to the fluidics of the pump. The pressure profile is then perceivably influenced by the fluidics behind the pump. Then, the pressure drop after pre-compression becomes smaller, although the flow error remains the same. Consequently, the firmware can now only determine the correction variable over multiple pump cycles, or even not at all. The connected volume of the fluidics influences the measurement.

The method for determining the correction variable in a low-pressure gradient pump demands that the pressure drop after pre-compression is created only by an adiabatically caused flow error. A pressure drop also occurs if the pump sucks in an air bubble, which cannot be differentiated from the former case. Thus, the calculation of the correction variable must be reset to zero, as otherwise the iterative calculation chain would be interrupted.

Moreover, it is impossible to apply that same method to a high-pressure gradient pump since it has more than one drive. Associated with that is the presence of more than one pre-compression, with the multiple pre-compressions being detected by means of a common system pressure sensor. Based on the positional angles of the cams, it can still be matched which pressure drop belongs to which drive. But in the case that the differences of the positional angles of the cams are too small, the matching ability is lost, as well. A possible countermeasure for this would be a synchronization of the drives of a high-pressure gradient pump, so that the pressure drops are clearly separated from each other with respect to their timing. However, this in turn requires a variably settable size of the pump cycle, which is not possible in a camshaft pump that does not include the option of direction reversal.

Also in a low-pressure gradient pump, a bad seal at the working piston influences the pressure drop after pre-compression, thus impacting the correction variable.

That is, while some attempts have been made to operate a pump to account for the thermal expansion and/or compression of the fluid, the prior art solutions are still far from optimal. In light if the above, it is an object of the present invention to overcome or at least alleviate the shortcomings and disadvantages of the prior art. That is, it is an object of the present invention to provide a technology accounting for the thermal expansion and/or compression in a fluid that is pressurized and subsequently conveyed by a pump. Desirably, this technology should be simple, fail-safe, and reliable, and allows for a broad application.

These objects are met by the present invention.

According to a first embodiment, the present invention relates to a method of operating a pump generating a flow of a fluid with a pressure, the method comprising operating the pump with a pump speed S satisfying the equation $$S=S_{simple}(1+COR(t));$$

wherein S is the pump speed, $S_{simple}$ is the pump speed disregarding any compression and/or expansion of the fluid, t is a time, and COR(t) is a time dependent correction function;

wherein the time dependent correction function COR(t) is a product of a corrective amplitude $A_{cor}$ and a time-dependent function f(t), i.e., $COR(t)=A_{cor} \cdot f(t)$; and wherein the corrective amplitude $A_{cor}$ is set by means of a measure for the flow and a measure for the pressure.

In other words, the corrective amplitude $A_{cor}$ is calculated by means of the measure of the flow and the measure of the pressure intended to be generated by the pump. It will be understood that in some embodiments, the flow may be used as the measure for the flow and the pressure may be used as a measure for the pressure. However, in other embodiments, other measures depending on the flow and/or the pressure may be used instead. In still other words, the present method uses the flow and the pressure (or other measures thereof) as inputs to arrive at the corrective amplitude $A_{cor}$. In still other words, the corrective amplitude is predetermined as a function of the flow and the pressure (or other measures thereof). This is different to prior art disclosures not setting the corrective amplitude by any fixed rationale.

That is, different to prior art disclosures, the corrective amplitude $A_{cor}$ is simply calculated by using the flow and the pressure (or other measures thereof) as inputs. This provides a very simple and failsafe way of correcting for the effects of thermal expansion and/or compression. Furthermore, it has been found that such an operating method also provides very good results in terms of correctness of the corrective amplitude, and that this can also be supported by an in-depth analysis, as outlined below.

In some embodiments, the pump measures the pressure at the time of pre-compression and identifies the flow of the drive (though it is noted that in some other embodiments, other measures for the flow and the pressure may be used). The corrective amplitude (also referred to as "correction variable") is calculated from the two values of pressure and flow by using a mathematical function. With the correction variable, an additional velocity component is subsequently added to the pump speed (also referred to as "drive speed"). In some embodiments, this component follows an exponential rule for the relative change of velocity, which decreases over time. The time constant of the exponential rule may be fixed. The correction variable for the relative change of velocity has been previously calculated from the flow and the pressure.

The mathematical correlation follows from the observation that liquid cools off inside the pump (e.g., inside a cylinder of a working piston), and that the cooling off process occurs there mainly due to the low flow. A cooling effect due to the pumping process, whereby the liquid is pumped from the cylinder of the working piston (e.g., to the cylinder of the balance piston) so that an effectively larger contact surface for thermal conduction is present, can be neglected. Accordingly, the heat flow through the cylinder that leads to the cooling is equal to the decrease of the inner thermal energy of the liquid inside the cylinder of the working head, i.e., $$\dot{Q}+\dot{W}=0;$$

where $\dot{Q}$ is the heat flow through the pump head and $\dot{W}$ is the time derivative of the inner thermal energy of the liquid inside the working piston cylinder.

As for the heat flow and the inner thermal energy, the known correlations are inserted.

$$\frac{\lambda A}{l} \cdot \Delta T = -cm \cdot \Delta \dot{T};$$

where λ is the thermal conduction coefficient of the material of which the working piston cylinder is made;
A is the surface in the working piston cylinder via which the heat flow from the liquid to the working piston cylinder takes place;
l is the length of the path that the heat flow has to travel through the working piston cylinder;
ΔT is the (time-dependent) temperature difference of the liquid that is heated through pre-compression after the end of pre-compression;
Δ$\dot{T}$ is the time derivative of $$\Delta T, \text{ i.e., } \Delta \dot{T} = \frac{d}{dt}(\Delta T);$$

c is the thermal capacity of the liquid inside the working head cylinder;
m is the mass of the liquid inside the working head cylinder.

The resulting linear differential equation of the first order is solved by $$\Delta T = \Delta T_0 \cdot e^{-\frac{\lambda A}{lcm}t};$$

where $\Delta T_0$ is the temperature difference of the liquid heated by pre-compression at the beginning of the cooling off process or at the end of pre-compression.

The change of temperature causes a change in liquid volume. Since this change represents a time-dependent event, the time derivative of the temperature-dependent volume is the flow component that leads to the flow error which is to be compensated.

$$E = \dot{V} = \frac{d}{dt}V_0(1 + \alpha \cdot \Delta T) =$$

$$V_0 \alpha \cdot \Delta \dot{T} = -V_0 \alpha \frac{\lambda A}{lcm}\Delta T_0 \cdot e^{-\frac{\lambda A}{lcm}t} = -\alpha \frac{\lambda A}{lc\rho}\Delta T_0 \cdot e^{-\frac{\lambda A}{lcm}t};$$

where E is the flow error;
V is the volume of the liquid inside the working head cylinder (and $\dot{V}$ its time derivative);
$V_0$ is the theoretical volume of the liquid inside the working head cylinder at the end of pre-compression or at the beginning of the cooling off process, when disregarding the thermal expansion/compression;
α is the coefficient of volume expansion of the liquid inside the working head cylinder; and
ρ is the theoretical density of the liquid inside the working head cylinder at the end of pre-compression or at the beginning of the cooling off process, when disregarding the thermal expansion/compression, i.e., $\rho = m/V_0$.

Consequently, the amplitude of the flow error is determined as $$E_m = -\alpha \frac{\lambda A}{lc\rho}\Delta T_0$$

where $E_m$ is maximal flow error (at the beginning of the cooling off of the liquid inside the working head cylinder).

The flow error is a consequence of the previously performed pre-compression, because in this phase of the pump cycle compression work has been performed against the liquid inside the cylinder of the working piston. As for this change of state, the following equation applies:

$$W = \int_{p_0}^{p} p' \, dV$$

where W is the compression work applied to the liquid inside the working head cylinder;
p' is the pressure;
$p_0$ is the pressure at the start of pressurization; and
p is the pressure at the end of pressurization.

As for the differential of the integral, a determination can be carried out via the definition of compressibility $$\kappa = -\frac{1}{V}\frac{dV}{dp'} \Rightarrow V = V_{start}e^{-\kappa(p'-p_0)} \Rightarrow dV = -V_{start}\kappa e^{-\kappa(p'-p_0)}dp'$$

where κ is the compressibility of the liquid inside the working head cylinder;
$V_{start}$ is the volume of the liquid inside the working head cylinder before pre-compression, i.e., at the start of pre-compression.

The exchange of the differential dV gives $$W = \int_{p_0}^{p} p' dV =$$

$$\kappa V_{start}\int_{p_0}^{p} p' e^{-\kappa(p'-p_0)}dp' = -V_{start}\left[\left(\frac{1}{\kappa}-p\right)e^{-\kappa(p-p_0)} - \left(\frac{1}{\kappa}-p_0\right)\right]$$

In the adiabatic case, the performed compression work is transformed into heat, wherein the following applies:

$$\Delta W = \Delta U = cm\Delta T_0 \Rightarrow \Delta T_0 = -\frac{\left(\frac{1}{\kappa}-p\right)e^{-\kappa(p-p_0)} - \left(\frac{1}{\kappa}-p_0\right)}{c\rho_{start}}$$

where $\rho_{start} = m/V_{start}$; and
ΔU is the change in heat energy.

Assuming that p, $p_0 \ll 1/\kappa$ and $p_0 = 0$ leads to $$\Delta T_0 \approx \frac{-1}{c\rho_{start}} \cdot \frac{1}{\kappa}(e^{-\kappa p} - 1);$$

And (with a Taylor-expansion of the exponential function) to $$\Delta T_0 \approx -\frac{1}{c\rho_{start}} \cdot \frac{1}{\kappa}(1 - \kappa p - 1) = \frac{p}{c\rho_{start}}$$

$$\Rightarrow E_m = -\alpha\frac{\lambda A}{lc\rho} \cdot \frac{p}{c\rho_{start}}$$

This approximates the change of the temperature after pre-compression.

For the relative change of the velocity of the pump, the correction variable is determined as $$A_{cor} = \frac{E_m}{F} = \alpha \frac{\lambda A}{lc\rho} \frac{\Delta T_0}{F}$$

After the approximation for $\Delta T_0$ has been inserted, one obtains $$A_{cor} = \alpha \frac{\lambda A}{lc^2 \rho \rho_{start}} \frac{p}{F}$$

Although the used liquids are compressible to some extent, the compressibility only leads to a small change in the liquid's density (e.g., for water at 10° C., the density changes only by less than 5% between atmospheric pressure and 1000 bar). This allows for the approximation $\rho \approx \rho_{start}$, thus arriving at a linear correlation between the quotients of pressure and flow of the drive and the correction variable:

$$A_{cor} = \alpha \frac{\lambda A}{lc^2 \rho^2} \frac{p}{F} = \gamma \cdot \frac{p}{F}$$

where $\gamma$ is a constant. That is, there is a fixed relationship between the analytical pressure, the flow and the correction variable (=corrective amplitude). Put differently, knowledge of the linear equation of p/F against the correction variable is sufficient.

For sake of completeness, the symbols used above are repeated:

$\dot{Q}$ heat flow through the pump head
$\dot{W}$ time derivative of the inner thermal energy of the liquid inside the working piston cylinder
$\lambda$ thermal conduction coefficient of the material of which the working piston cylinder is made
A surface in the working piston cylinder via which the heat flow from the liquid to the working piston cylinder takes place
I length of the path that the heat flow has to travel through the working piston cylinder
$\Delta T$ (time-dependent) temperature difference of the liquid that is heated through pre-compression after the end of pre-compression
$\Delta \dot{T}$ time derivative of $\Delta T$
c thermal capacity of the liquid inside the working head cylinder
m mass of the liquid inside the working head cylinder
E flow error due to the thermal compression after the pre-compression
F flow of the drive
t time
$V_0$ is the theoretical volume of the liquid inside the working head cylinder at the beginning of the cooling off process when disregarding the thermal expansion/compression
$\alpha$ coefficient of volume expansion of the liquid inside the working head cylinder
$E_m$ maximal flow error (at the beginning of the cooling off of the liquid inside the working head cylinder)
W compression work applied to the liquid inside the working head cylinder
p' pressure
$p_0$ pressure before the beginning of pre-compression
p pressure at the end of the pre-compression
V volume of the liquid inside the working head cylinder
$\kappa$ compressibility of the liquid inside the working head cylinder
$\Delta T_0$ temperature difference of the liquid heated by pre-compression at the beginning of the cooling off process or at the end of pre-compression
$\rho$ the theoretical density of the liquid inside the working head cylinder at the end of pre-compression or at the beginning of the cooling off process, when disregarding the thermal expansion/compression
$\rho_{start}$ the density of the liquid at the start of the pre-compression
$A_{cor}$ correction variable That is, the relationship between the corrective amplitude $A_{cor}$, the pressure at the end of the pre-compression p and the flow F depends on characteristics of the fluid ($\alpha$, c, $\rho$) and the geometry and material of the pump ($\lambda$, A, I).

That is, it is possible to arrive at a predetermined relationship between the pressure p, the flow F and the corrective amplitude $A_{cor}$.

In practice, one can perform a calibration setting (also referred to as test setting) with a certain pressure $p_{cal}$ and a certain flow $F_{cal}$ and determine which corrective amplitude $A_{cor}$ works best for these settings. Once this is known, one can derive a relationship between any pressure p, flow F and the respective corrective amplitude $A_{cor}$. Thus, the method of the present invention sets the corrective amplitude $A_{cor}$ by means of the flow (or another measure of the flow) and the pressure (or another measure of the pressure).

Put differently, in the present invention, the consequences of the thermal effect which can lead to the undesired flow error can be determined beforehand, and can then be compensated by a correspondingly corrected pump speed (e.g., piston speeds). At that, the piston speeds are corrected by a previously calculated correction amplitude, so that the undesired flow error is largely avoided.

It is noted that heating and cooling the liquid may performed in the same manner and independently of the connected fluidics in all identically constructed pumps. This fact makes it possible to first measure the flow error in a low-volume system. In this way, it is achieved that the flow error can be measured with the system pressure at a constant flow resistance. With such a structure, the mathematical function that determines the correction variable based on the pressure and the flow is specified. With the help of this function, the flow error can now be corrected. It is now irrelevant for this purpose what kind of fluidics is connected to the pump, because the values for the flow and the pressure are not influenced by that to such a degree as to have any impact on the correction variable.

Generally, it has been found that the correction values for compensating thermal effects after pre-compression can be determined exclusively from the values for the flow of the drive and the pressure.

The present invention makes it possible to determine the correction variable for the speed correction based (exclusively) on the knowledge of the set flow of a drive and the measurement of the pressure, or other measures of these two. Since the mathematical function for determining the correction variable was carried out independently of the connected fluidics, the connected fluidics will not influence the determination of the correction values. The pre-determined mathematical equation results in further advantages: The correction variable of the flow error can also be determined at a low flow where thermal effects do not manifest themselves in significant deviations of the pre-compression between the adiabatic and the isothermal borderline case. The influence of the pressure-dependent compressibility does not have to be taken into account. There is no necessity to take into account a pressure profile. There is no influence of air bubbles. No electronic pressure controller is necessary. Leakages do no exert any influence. The value determination cannot interfere with other controllers because only selective values have to be acquired. The use of smaller mixers is facilitated because the periodic flow errors are minimized. When smaller mixers are used, the composition of the mixture can be changed more quickly, whereby the analysis process throughput is increased. The invention can be used with high-pressure a well as low-pressure gradient pumps. The softness of the connected fluidic does not play any role.

In the step of setting the corrective amplitude $A_{cor}$ by means of the measure of the flow and the measure of the pressure, the corrective amplitude $A_{cor}$ may be set by means of the quotient of the measure for the flow and the measure of the pressure, i.e., $A_{cor} = f\left(\dfrac{p}{F}\right)$.

This may be a particularly simple, fast and reliable way of setting the corrective amplitude.

In the step of setting the corrective amplitude $A_{cor}$ by means of the measure of the flow and the measure of the pressure, the corrective amplitude $A_{cor}$ may be proportional to the measure of the pressure, i.e., $A_{cor} \sim p$, where p is the measure of the pressure.

In the step of setting the corrective amplitude $A_{cor}$ by means of the measure of the flow and the measure of the pressure, the corrective amplitude $A_{cor}$ may be inversely proportional to the measure of the flow, i.e., $A_{cor} \sim 1/F$, where F is the measure of the flow.

That is, in some embodiments, the corrective amplitude may satisfy the equation $$A_{cor} = \gamma \cdot \dfrac{p}{F};$$

where $\gamma$ is a constant.

The method may further comprise determining a dependency between the measure of the flow, the measure of the pressure and the corrective amplitude $A_{cor}$.

That is, the method may also comprise a "test run" for setting or calibrating the relationship between these measures.

The step of determining the dependency may be performed with a test flow of 1 μl/min to 10000 μl/min, preferably 1 μl/min to 5000 μl/min, further preferably 10 μl/min to 1200 μl/min.

That is, the test run may also be performed with relatively low flows.

For such low flows, the difference between an adiabatic and an isothermal compression is relatively small. Nevertheless, adiabatic effects may occur, and there may be (at least small) deviations between the adiabatic and isothermal cases. Such deviations may be determined in the test run. In other words, the effects the compression has on the flow error will be determined in the test run. In the test run, such effects will be minimized and the settings for the corrective amplitude will be determined.

Thus, also adiabatic effects occurring in the test run will be accounted for.

This enables the user to perform a test or calibration run accounting for the adiabatic effects and thus to compensate for the flow error and to determine the corrective amplitude, which depends on the flow and the pressure.

As discussed, this function may then be used in the complete area defined by flow and pressure. In some embodiments, the method may also comprise determining the flow and pressure area for which the functional relationship has been approved. In the area defined by flow and pressure (which may have been approved), the adiabatic effects may occur, but the present invention may account for the adiabatic effects, i.e., the adiabatic effects no longer have an impact on the flow error (or the flow error caused by the adiabatic effects is at least reduced).

The step of determining the dependency may be performed with a test pressure of 50 to 1500 bar, preferably 50 to 700 bar.

Thus, the dependency can be determined with the pressures normally occurring during the operation of the pump.

The time-dependent function f(t) may be a continuous function, e.g., $f\colon [0;\infty[ \to \mathbb{R}$.

The time-dependent function f(t) may at least approximately satisfy $$f(t) = \exp\left(-\dfrac{t}{\tau}\right)$$

at least for $t \leq \tau$; wherein $\tau$ is a time constant.

The time-dependent function f(t) at least approximately satisfying $$f(t) = \exp\left(-\dfrac{t}{\tau}\right)$$

may denote that $$0.5 \cdot \exp\left(-\dfrac{t}{\tau}\right) \leq f(t) \leq 1.5 \cdot \exp\left(-\dfrac{t}{\tau}\right).$$

More particularly, the time-dependent function f(t) at least approximately satisfying $$f(t) = \exp\left(-\dfrac{t}{\tau}\right)$$

may denote that $$0.7 \cdot \exp\left(-\dfrac{t}{\tau}\right) \leq f(t) \leq 1.3 \cdot \exp\left(-\dfrac{t}{\tau}\right).$$

More particularly still, the time-dependent function f(t) at least approximately satisfying $$f(t) = \exp\left(-\dfrac{t}{\tau}\right)$$

may denote that $$0.9 \cdot \exp\left(-\frac{t}{\tau}\right) \le f(t) \le 1.1 \cdot \exp\left(-\frac{t}{\tau}\right).$$

τ may be in the range of 200 ms to 12000 ms, preferably 500 ms to 5000 ms, further preferably 3500 ms to 4500 ms, such as 3900 ms to 4100 ms.

The pump may generate a flow in the range of 0 to 10 ml/min.

The pump may generate a pressure in the range of 0 to 1500 bar, preferably 100 bar to 1500 bar, such as 500 bar to 1500 bar.

That is, the pump may be operated with relatively high pressures, e.g., the pressures normally occurring during HPLC analyses.

The pump may be operated in different phases including a suction phase wherein the pump sucks in the fluid; a pre-compression phase, wherein a pressure of the fluid is increased; and a conveying phase, wherein the pressurized fluid is supplied to another unit; wherein the pump speed satisfies the equation at least for a time at the beginning of the delivery phase.

That is, in cases where one piston is provided, the pump speed S may denote a velocity of said piston; and in cases where more than one piston (e.g., two pistons) are provided, the pump speed may denote the sum of the velocities of the pistons.

The pump may comprise at least one piston and the pump speed S may denote the sum of velocities of the at least one piston.

A current for driving a motor of the pump may be used as the measure for the pressure.

In such embodiments, no additional pressure sensor may be requires, but the method may simply use the current for driving the motor, which may be easily detected.

The measure of the pressure may be derived by the compressibility of the fluid and the compression of the fluid.

That is, one may simply use the compression of the fluid, instead of having to individually measure the pressure.

The measure of the pressure may also be derived by a strain of a structure subjected to the pressure.

Again, this may omit the need of measuring the pressure.

The measure for the flow may be an actual measurement of the flow.

The method may further comprise the pump receiving at least one parameter for the time dependent correction function COR(t) from an external unit.

Parameters for the time dependent correction function COR(t) may include features of the corrective amplitude $A_{cor}$ (e.g., its dependency on pressure and flow) and features of the time-dependent function f(t). Thus, the pump may receive information relating to different situations, e.g., to different fluids that are used in connection with the pump.

For example, the correction function may be different when the pump is used to supply water or when the pump is used to supply trifluoroacetic acid. The pump may receive such different parameters for different operations from an external unit to allow its operation under different circumstances.

That is, the pump may be updated with new operation parameters.

The method may further comprise performing a calibration run with the external unit to obtain the at least one parameter and sending the at least one parameter from the external unit to the pump.

That is, the external unit may first perform a calibration run (e.g., with a corresponding pump), e.g., for a new fluid to be supplied by the pump, and may then send the respective parameters to the pump.

The method may further comprises selecting the correction function COR(t) from a set of correction functions.

This may also allow to increase the versatility of the pump.

The set of correction function may comprise a plurality of correction functions for different solvents.

The present invention also relates to a use of the method discussed above in a high performance liquid chromatography (HPLC) method.

This may be a particularly useful application of the discussed pump.

The HPLC method may comprise mixing of solvents, wherein each solvent is supplied by a pump and wherein at least one pump is operated according to any of the preceding method embodiments.

The solvents may be mixed with ratios varying over time.

That is, the present invention may also be employed in gradient applications.

One solvent may comprise water and another solvent may comprise acetonitrile.

At least one solvent may comprise trifluoroacetic acid.

As discussed, the present invention seeks to account for the effects of thermal expansion/contraction of the fluid. To account for such effects may be particularly advantageous when at least one solvent comprises trifluoroacetic acid (TFA).

It will be understood that fluctuations in TFA concentration occur in methods including TFA.

In situations where one solvent (e.g, acetonitrile—ACN) also comprises TFA, the solvent (ACN) is be pre-compressed. In that process, the ACN including TFA is inevitably heated. As a result, the above-described flow error is created. Due to this flow error, system variations occur in the concentration of TFA as a result of the interaction of TFA with a column of the chromatography. The variations in concentration may become visible in the UV detector as an additional high degree of noise of the absorption signal. This additional noise may become so high that analytes can no longer be measured.

There are different possible solution to this. One would be the integration of an additional unit in the chromatography pump that mixes the pump flow, so that the variations in concentration are decreased through mixing. But this solution requires larger mixing volumes. But when large mixing volumes are used, the duration of the method of analysis is prolonged, so that less analyses can be carried out per day. This is in conflict to the desire to perform as many analyses as possible. When mixers with a small volume are used, a reduction of the periodicity of the piston cycle has to be achieved. In this manner, the liquid volume pumped per piston cycle is reduced. The periodically occurring disturbances can then be compensated again through a mixer with a smaller volume. However, the use of this solution requires a pump drive with a piston cycle of a variable size. In pumps with camshafts this is not possible without reversing the direction. In camshaft pumps that do not include the option to reverse the direction, the volume of the piston cycle is constant and cannot be varied due to the construction type.

In summary, the problem relates to compensating the flow error of the chromatography pump following the end of pre-compression, and to determine the magnitude of the compensation.

It will be understood that while other solutions may exist, the solution of the present invention may be considered superior. This is why the present invention is particularly well suited to situations where at least one solvent comprises TFA.

The HPLC method may comprise detecting an absorption spectrum of a sample.

The absorption spectrum may be a UV spectrum.

The present invention also relates to a pump configured to carry out the method discussed above.

The pump may comprise a controller configured to operate the pump in accordance with the discussed method.

The pump may comprise at least one piston.

The pump may comprise a plurality of pistons, such as two pistons.

The pistons may be arranged in parallel with regard to the fluid path.

Alternatively, the pistons may also be arranged in series with regard to the fluid path.

The pump may comprise one camshaft per piston for driving the respective piston.

The pump may comprise a mandrel per piston for driving the respective piston.

The pump may be configured to drive the plurality of pistons independently from one another.

The pump may be configured to drive the plurality of pistons dependently to one another.

The present invention also relates to a pump system comprising a pump as discussed above.

It will be understood that such a pump and pump system may have advantages corresponding to the advantages discussed above.

The pump system may also comprise a plurality of pumps as discussed above.

The present invention also relates to a HPLC system comprising a pump as discussed above or a pump system as discussed above.

The present invention also relates to an HPLC system configured for the use discussed above.

The discussed method may use the pump discussed above.

The present invention also relates to the numbered embodiments discussed below.

Below, method embodiments will be discussed. The method embodiments carry the letter "M" followed by a number. When reference is herein made to "method embodiments", these embodiments are meant.

M1. A method of operating a pump generating a flow of a fluid with a pressure, the method comprising operating the pump with a pump speed S satisfying the equation $$S = S_{simple}(1 + COR(t));$$

wherein S is the pump speed, $S_{simple}$ is the pump speed disregarding any compression and/or expansion of the fluid, t is a time, and COR(t) is a time dependent correction function;

wherein the time dependent correction function COR(t) is a product of a corrective amplitude $A_{cor}$ and a time-dependent function f(t), i.e., $COR(t) = A_{cor} \cdot f(t)$; and wherein the corrective amplitude $A_{cor}$ is set by means of a measure for the flow and a measure for the pressure.

In other words, the corrective amplitude $A_{cor}$ is calculated by means of the measure of the flow and the measure of the pressure intended to be generated by the pump. It will be understood that in some embodiments, the flow may be used as the measure for the flow and the pressure may be used as a measure for the pressure. However, in other embodiments, other measures depending on the flow and/or the pressure may be used instead. In still other words, the present method uses the flow and the pressure (or other measures thereof) as inputs to arrive at the corrective amplitude $A_{cor}$. In still other words, the corrective amplitude is predetermined as a function of the flow and the pressure (or other measures thereof). This is different to prior art disclosures not setting the corrective amplitude by any fixed rationale.

M2. The method according to the preceding embodiment, wherein in the step of setting the corrective amplitude $A_{cor}$ by means of the measure of the flow and the measure of the pressure, the corrective amplitude is $A_{cor}$ is set by means of the quotient of the measure for the pressure and the measure of the flow, $$\text{i.e., } A_{cor} = f\left(\frac{p}{F}\right).$$

M3. The method according to any of the preceding embodiment, wherein in the step of setting the corrective amplitude $A_{cor}$ by means of the measure of the flow and the measure of the pressure, the corrective amplitude $A_{cor}$ is proportional to the measure of the pressure, i.e., $A_{cor} \sim p$, where p is the measure of the pressure.

M4. The method according to any of the preceding embodiments, wherein in the step of setting the corrective amplitude $A_{cor}$ by means of the measure of the flow and the measure of the pressure, the corrective amplitude $A_{cor}$ is inversely proportional to the measure of the flow, i.e., $A_{cor} \sim 1/F$, where F is the measure of the flow.

M5. The method according to the preceding embodiment and with the features of the penultimate embodiment, $$\text{i.e., } A_{cor} = \gamma \cdot \frac{p}{F};$$

where γ is a constant.

M6. The method according to any of the preceding embodiments and further comprising determining a dependency between the measure of the flow, the measure of the pressure and the corrective amplitude $A_{cor}$.

M7. The method according to the preceding embodiment wherein the step of determining the dependency is performed with a test flow of 1 μl/min to 10000 μl/min, preferably 1 μl/min to 5000 μl/min, further preferably 10 μl/min to 1200 μl/min.

That is, according to some embodiments, the dependency between the flow, the pressure and the corrective amplitude is determined with relatively low flow rates. This may be different to prior art disclosures.

M8. The method according to any of the preceding embodiments with the features of embodiment M6 wherein the step of determining the dependency is performed with a test pressure of 50 to 1500 bar, preferably 50 to 700 bar.

Thus, the dependency can be determined with the pressures normally occurring during the operation of the pump.

M9. The method according to any of the preceding embodiments, wherein the time-dependent function f(t) is a well defined function, e.g., $f: [0; \infty[ \to \mathbb{R}$.

M10. The method according to any of the preceding embodiments wherein the time-dependent function f(t) at least approximately satisfies $$f(t) = \exp\left(-\frac{t}{\tau}\right)$$

at least for t≤τ; wherein τ is a time constant.

M11. The method according to the preceding embodiment, wherein the time-dependent function f(t) at least approximately satisfying $$f(t) = \exp\left(-\frac{t}{\tau}\right)$$

denotes that $$0.5 \cdot \exp\left(-\frac{t}{\tau}\right) \le f(t) \le 1.5 \cdot \exp\left(-\frac{t}{\tau}\right).$$

M12. The method according to embodiment M10, wherein the time-dependent function f(t) at least approximately satisfying $$f(t) = \exp\left(-\frac{t}{\tau}\right)$$

denotes that $$0.7 \cdot \exp\left(-\frac{t}{\tau}\right) \le f(t) \le 1.3 \cdot \exp\left(-\frac{t}{\tau}\right).$$

M13. The method according to embodiment M10, wherein the time-dependent function f(t) at least approximately satisfying $$f(t) = \exp\left(-\frac{t}{\tau}\right)$$

denotes that $$0.9 \cdot \exp\left(-\frac{t}{\tau}\right) \le f(t) \le 1.1 \cdot \exp\left(-\frac{t}{\tau}\right).$$

M14. The method according to any of the preceding embodiments and with the features of embodiment M10, wherein r is in the range of 200 ms to 12000 ms, preferably 500 ms to 5000 ms, further preferably 3500 ms to 4500 ms, such as 3900 ms to 4100 ms.

M15. The method according to any of the preceding embodiments, wherein the pump generates a flow in the range of 0 to 10 ml/min.

M16. The method according to any of the preceding embodiments, wherein the pump generates a pressure in the range of 0 to 1500 bar, preferably 100 bar to 1500 bar, such as 500 bar to 1500 bar.

M17. The method according to any of the preceding embodiments, wherein the pump is operated in different phases including a suction phase wherein the pump sucks in the fluid;

a pre-compression phase, wherein a pressure of the fluid is increased; and a conveying phase, wherein the pressurized fluid is supplied to another unit;

wherein the pump speed satisfies the equation at least for a time at the beginning of the delivery phase.

That is, in cases where one piston is provided, the pump speed S denotes a velocity of said piston; and in cases where more than one piston (e.g., two pistons) are provided, the pump speed denotes the sum of the velocities of the pistons.

M18. The method according to any of the preceding embodiments, wherein the pump comprises at least one piston and the pump speed S denotes the sum of velocities of the at least one piston.

M19. The method according to any of the preceding embodiments, wherein a current for driving a motor of the pump is used as the measure for the pressure.

M20. The method according to any of the embodiments M1 to M18, wherein the measure of the pressure is derived by the compressibility of the fluid and the compression of the fluid.

M21. The method according to any of the embodiments M1 to M18, wherein the measure of the pressure is derived by a strain of a structure subjected to the pressure.

M22. The method according to any of the preceding embodiments, wherein the measure for the flow is an actual measurement of the flow.

M23. The method according to any of the preceding embodiments, wherein the method further comprises the pump receiving at least one parameter for the time dependent correction function COR(t) from an external unit.

M24. The method according to the preceding embodiment, wherein the method further comprises performing a calibration run with the external unit to obtain the at least one parameter and sending the at least one parameter from the external unit to the pump.

M25. The method according to any of the preceding embodiments, wherein the method further comprises selecting the correction function COR(t) from a set of correction functions.

M26. The method according to the preceding embodiment, wherein the set of correction function comprises a plurality of correction functions for different solvents.

Below, use embodiments will be discussed. The use embodiments carry the letter "U" followed by a number. When reference is herein made to "use embodiments", these embodiments are meant.

U1. Use of the method according to any of the preceding embodiments in a high performance liquid chromatography (HPLC) method.

U2. The use according to the preceding embodiment, wherein the HPLC method comprises mixing of solvents, wherein each solvent is supplied by a pump and wherein at least one pump is operated according to any of the preceding method embodiments.

U3. The use according to the preceding embodiment, wherein the solvents are mixed with ratios varying over time.

U4. The use according to any of the two preceding embodiments, wherein one solvent comprises water and another solvent comprises acetonitrile.

U5. The use according to any of the preceding use embodiments with the features of embodiment U2, wherein at least one solvent comprises trifluoroacetic acid.

U6. The use according to any of the preceding use embodiments wherein the HPLC method comprises detecting an absorption spectrum of a sample.

U7. The use according to the preceding embodiment wherein the absorption spectrum is a UV spectrum.

Below, pump embodiments will be discussed. The pump embodiments carry the letter "P" followed by a number. When reference is herein made to "pump embodiments", these embodiments are meant.

P1. A pump configured to carry out the method of any of the preceding method embodiments.

P2. The pump according to the preceding embodiment, wherein the pump comprises a controller configured to operate the pump in accordance with the method of any of the preceding method embodiments.

P3. The pump according to any of the preceding pump embodiments, wherein the pump comprises at least one piston.

P4. The pump according to any of the preceding pump embodiments, wherein the pump comprises a plurality of pistons, such as two pistons.

P5. The pump according to the preceding embodiment, wherein the pistons are arranged in parallel with regard to the fluid path.

P6. The pump according to the penultimate embodiment, wherein the pistons are arranged in series with regard to the fluid path.

P7. The pump according to any of the preceding pump embodiments with the features of embodiments P3 or P4, wherein the pump comprises a camshaft per piston for driving the respective piston.

P8. The pump according to any of the preceding pump embodiments with the features of embodiments P3 or P4, wherein the pump comprises a mandrel per piston for driving the respective piston.

P9. The pump according to any of the preceding pump embodiments with the features of embodiment P4, wherein the pump is configured to drive the plurality of pistons independently from one another.

P10. The pump according to any of the preceding pump embodiments with the features of embodiment P4, wherein the pump is configured to drive the plurality of pistons dependently on one another.

Below, pump system embodiments will be discussed. The pump system embodiments carry the letters "PS" followed by a number. When reference is herein made to "pump system embodiments" or to "PS embodiments", these embodiments are meant.

PS1. A pump system comprising a pump according to any of the preceding pump embodiments.

PS2. A pump system comprising a plurality of pumps according to any of the preceding pump embodiments.

Below, high performance liquid chromatography system embodiments will be discussed. The high performance liquid chromatography embodiments carry the letters "H" followed by a number. When reference is herein made to "high performance liquid chromatography system" or to "HPLC embodiments", these embodiments are meant.

H1. An HPLC system comprising a pump according to any of the preceding pump embodiments or a pump system according to any of the preceding PS embodiments.

H2. An HPLC system configured for the use of any of the preceding use embodiments.

M27. The method according to any of the preceding method embodiments, wherein the method uses the pump according to any of the preceding pump embodiments.

BRIEF DESCRIPTIONS OF DRAWINGS

The invention will now be described with further reference to the accompanying drawings. This description is intended to exemplify, and not to limit, the scope of the present invention.

DETAILED DESCRIPTION OF THE DRAWINGS

Figure 4:
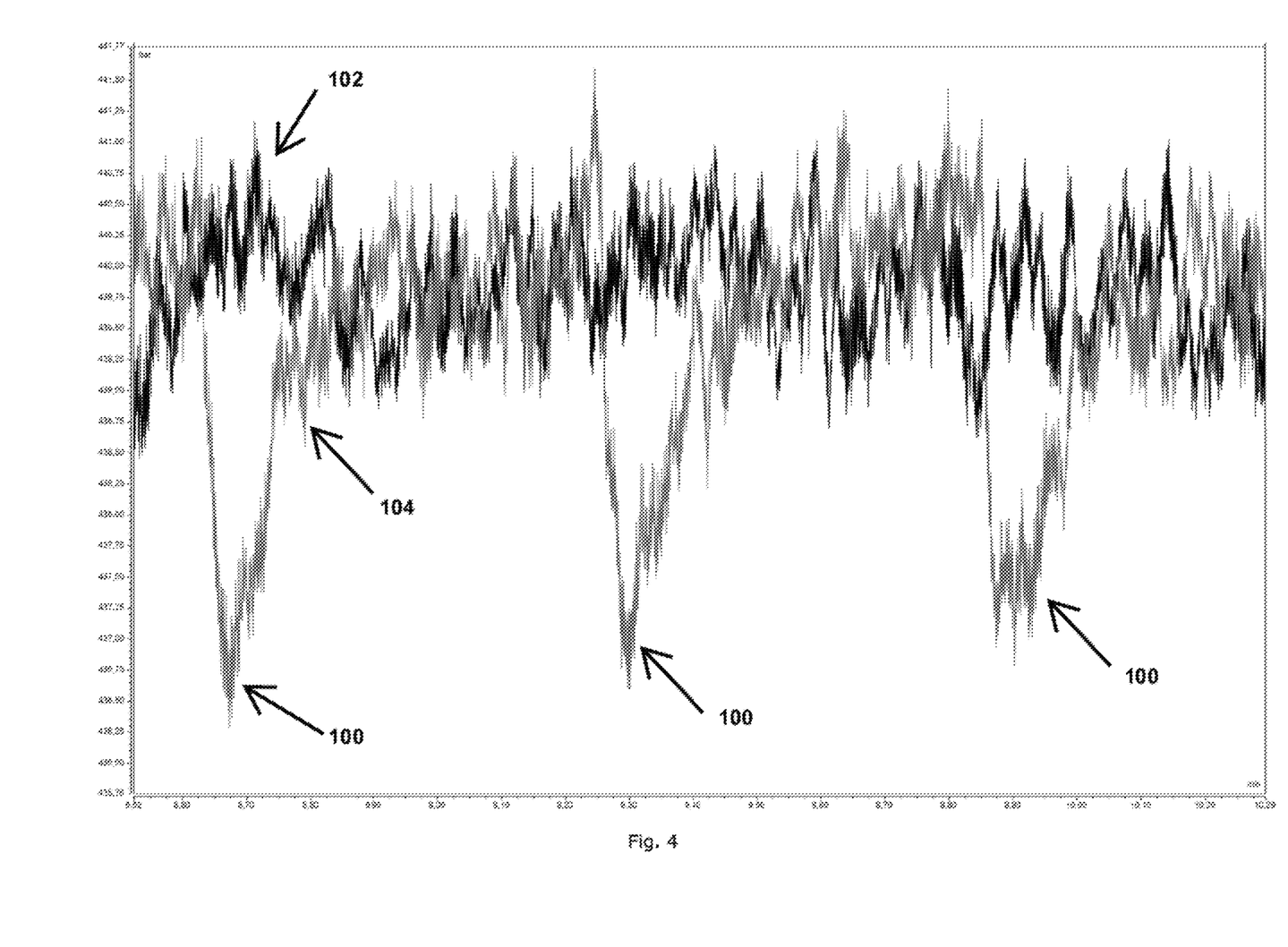
FIG. 4 depicts pressure signals of pumps that are operated according to the prior art and according to an embodiment of the present invention.

FIG. 1 depicts a pump. The mechanical parts of the pump have already been described above. Thus, as regards the mechanical parts of the pump, reference can be made to the above. However, the depicted pump can also be operated according to embodiments of the present invention, as discussed above. In particular, the pump may comprise a controller (not depicted) that operates the pump in the manner described above. More particularly, the controller may control the pump speed. As already discussed, the pump depicted in FIG. 1 comprises two pistons 11 and 21, and each of these pistons 11, 21 may be operated with a certain speed. The overall pump speed may be a sum of the speeds of the two pistons. As already discussed, the operation of the pump may include a pre-compression phase and a conveying phase. In the pre-compression phase, there is (initially un-pressurized) liquid in working head 10. This liquid is pressurized while inlet valve 15 and outlet valve 16 are closed. The liquid may thus be brought to a system pressure, which may be on the order of 100 to 1.500 bar. Once it is pressurized, the outlet valve 16 may be opened to convey the liquid from the head 10 to other components (thereby bringing the pump into the conveying phase). During the pre-compression state, the liquid is pressurized and its temperature rises. At a time interval at the beginning of the conveying phase, the liquid cools down again, mainly due to heat convection in the pump. This cooling leads to a reduction in volume and thus to a reduction in the flow (if no other measures are provided). This flow reduction is also schematically depicted in FIG. 2 (see section 45 of the pressure signal in FIG. 2 and also the above explanations in that regard). This can also be seen in the real pressure signal depicted in FIG. 4. The grey signal 104 in FIG. 4 depicts a real pressure signal in a pump when not accounting for the thermal compression at the beginning of the conveying phase. Also in this FIG. 4, distinct pressure drops 100 are visible.

To account for this effect due to the thermal compression of the liquid in the pump, the pump speed (e.g., the sum of the speeds of pistons 11 and 21) in the conveying phase is controlled in a more sophisticated manner. More particularly, at the beginning of the conveying phase, another speed component accounting for the thermal compression is superposed to the other speed component.

Figure 3:
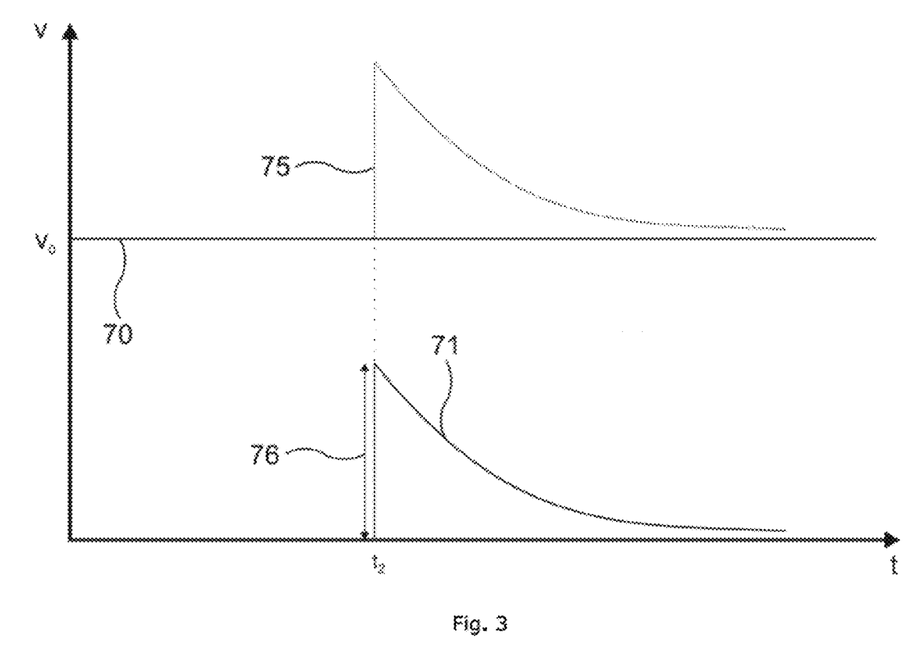
FIG. 3 depicts an exemplary speed of a pump that is operated according an embodiment of to the present invention.

An example for such a speed component is depicted in FIG. 3. In the discussed case, both pistons 11, 21 participate in the flow generation during the conveying phase. Thus, as also discussed, the correction can be carried out with the working psiton 11, the balance piston 21, or both pistons 11, 21. Thus, the velocity denotes the sum of the two piston speeds of working and balance piston here, wherein positive velocities stand for a forward movement of the piston. The movement of the two pistons creates the desired nominal flow.

Referring to FIG. 3, velocity $V_0$ or line 70 is the piston speed that is necessary to create the set flow when not taking into account the thermal effects. In the regarded example, a constant flow rate is assumed, so that this velocity is constant.

To carry out a correction, a correction component 71 is superimposed on this velocity. It follows a descending exponential function with the amplitude 76 which is given by the correction amplitude $A_{cor}$ as a prefactor and a time constant. As the time constant, the use of a constant time designation has proven to be expedient. The size of the correction amplitude typically lies between 0% and 10% of the set nominal flow. The time constant typically lies at about 4000 ms.

The exponential development reflects the cooling process, which theoretically also follows a descending exponential function. The pressure drop 45 is compensated by superimposing the correction component, so that the system pressure follows the development 41 beyond the point in time $t_2$ (see FIG. 2). That is, the (not depicted) controller may control the pump depicted in FIG. 1 accordingly.

The correction amplitude 76 $(=A_{cor})$ may be calculated by simply using the pressure and the flow. That is, the corrective amplitude may be a function of the pressure and the flow, $A_{cor}=f(p, F)$, and, more particularly, the corrective amplitude may be a function of the quotient p/F, i.e., $A_{cor}=f(p/F)$. In embodiments of the present inventions, the correction amplitude (also referred to as corrective amplitude) is proportional to the pressure and inversely proportional to the flow. In such embodiments, there is a proportionality constant γ between the quotient p/F and the corrective amplitude $A_{cor}$, i.e., $A_{cor}=\gamma \cdot p/F$. In such embodiments, the system is tested with a test or calibration pressure $p_{test}$ and a test or calibration flow $F_{test}$, and the ideal setting for the corrective amplitude $A_{cor}$ is found for such a test setup. The ideal setting for the corrective amplitude $A_{cor}$ may be found by considering the pressure signal (e.g., the one in FIG. 4) for different corrective amplitudes $A_{cor}$ and by determining where the pressure drops 100 do not occur. Thus, for the test setup, p, F, and $A_{cor}$ are known, such that γ can be determined (it will be understood that it is also envisaged by the present invention that more than one such test or calibration setup with different pressures and/or flows is envisaged). This proportionality constant can then be used to set the corrective amplitude $A_{cor}$ for other pressure and flow settings. In particular, the test setting for the flow $F_{test}$ may be a relatively low flow, such as 10 µl/min to 1200 µl/min. This may be particularly advantageous as at such low flow settings, thermal effects due to differences between the adiabatic and isotherm case do not strongly influence the test setup.

Thus, one may arrive at a simple-to-use, user-friendly and failsafe correlation between the pressure, the flow, and corrective amplitude. This may allow the pump to account for the thermal compression effect in a simple and effective manner. Operating the pump in such a way typically leads to an operation that is more stable with regard to the flow and the pressure. This can be seen in FIG. 4, where the black pressure signal 102 is a pressure signal over time of a pump that is operated according to the described embodiment. As can be seen, there is no periodic pressure signal (or, put differently, such a periodic pressure signal is significantly reduced).

Such a pump may also be used in a HPLC system comprising an analytical column and an analysis tool, such as a UV spectrometer. That is, in such a HPLC system, a sample is provided. The sample is pushed through the analytical column by means of a solvent supplied by the pump, and the sample is subsequently analyzed by means of the UV spectrometer. That is, the sample and the solvent are subjected to UV radiation and the absorption of the UV radiation is measured. It will be understood that the solvent itself may also give rise to some absorption. Ideally, the absorption of the solvent is constant, such that is may be subtracted from the remainder of the signal, and the subtraction is the signal due to the sample to be analyzed. However, when the pressure and/or flow of the solvent changes over time (see signal 104 in FIG. 4), this may also lead to a non-constant absorption signal of the solvent. This is depicted in FIG. 5.

Again, the grey curve 204 is a curve of a UV absorption signal of a solvent over time when the pump does not account for the thermal compression of the solvent after the pre-compression. For the test setup generating the curves depicted in FIG. 5, a mixture of water with 0.1 volume % TFA (solvent A) and ACN with 0, 1 volume % TFA (solvent B) was used. In the exemplary result of FIG. 5, at the beginning of the measurement, the two solvents were used with a mixing ratio A:B of 80:20 volume %. At the end of the measurement depicted in FIG. 5, the two solvents had a mixing ration A:B of 76:24 volume %. It is noted that the time axis of the graphs depicted in FIG. 5 corresponds to the one depicted in FIG. 4. It can be seen that the pressure drops 100 visible in FIG. 4 also lead to drops 200 in the UV signal. When comparing the time axes, it can be noted that the drops in the UV signal are delayed with respect to the drops in the pressure signal depicted in FIG. 4. In the present setup, the delay is approximately 0.8 to 0.9 minutes (i.e., the first drop 100 in FIG. 4 occurring at an approximate time of 8.7 minutes corresponds to the second drop 200 in the UV signal occurring at an approximate time of 9.5 minutes). This is due to the following: As discussed, the pump pressurize the solvent, which is then guided through the analytical column and subsequently analyzed by the UV spectrometer. That is, the pressure drops 100 visible in FIG. 4 do not have an immediate impact on the UV signal 204 in FIG. 5, but the pressure drops 200 first have to propagate through the analytical column and into the spectrometer before they become visible in the spectrometer signal. This explains the time lag between the pressure drops 100 in FIG. 4 and the UV spectrometer signal drops 200 in FIG. 5.

Nevertheless, the pressure drops 100 when not accounting for the thermal compression of the fluid in the pump lead to drops 200 in the UV signal, which drops 200 are caused by the solvent. As discussed, it is desirable to have a solvent signal in the UV spectrometer that is as constant as possible. Thus, the pressure drops 200 are undesirable.

Figure 5:
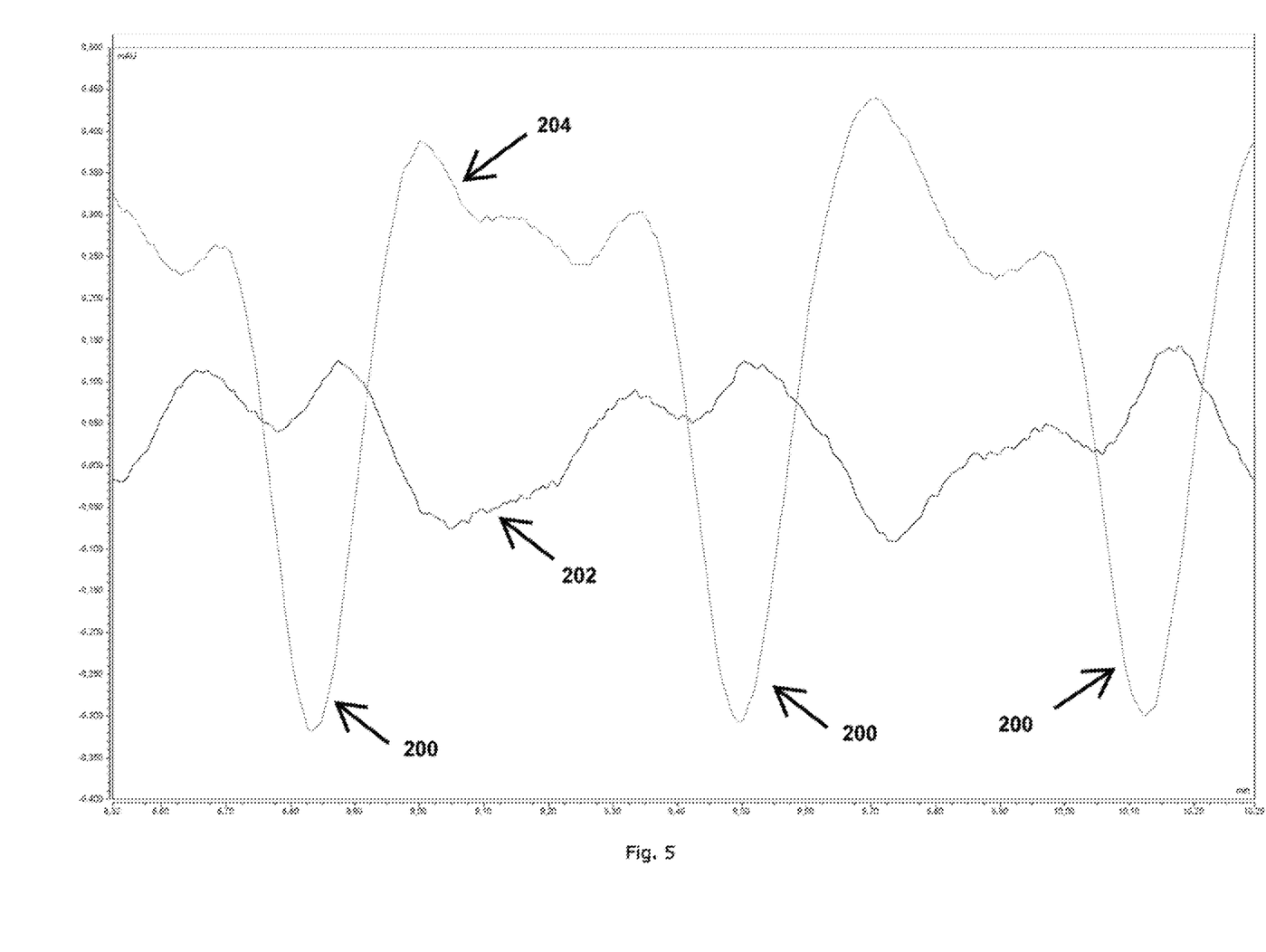
FIG. 5 depicts UV absorption signals of HPLC systems that are operated according to the prior art and according to an embodiment of the present invention.

FIG. 5 also depicts a second UV absorption signal 202 where a pump operated in accordance with the discussed embodiments was used. Similar as with the pressure signal 102 in FIG. 4, there are no sharp signal drops (such as the signal drops 200) due to the thermal compression of the fluid in the pump. Thus, the discussed embodiments leads to a UV absorption signal of the solvent that is much more constant. When comparing the signals 202 and 204, one realizes that the signal 202 (where a pump is operated according to embodiments of the present invention) lies in a range of approximately 0.2 units, while the signal 204 (where the pump is not operated in such a manner) lies in a range of approximately 0.8 units. Thus, when using the discussed embodiment, one arrives at a signal-to-noise ratio being approximately 4 times better than the comparative example.

While in the above, the invention has been described with reference to specific embodiments, the skilled person will understand that various alterations and modifications of the discussed embodiments are possible without departing from the scope of the invention. Some examples thereof are provided below.

For example, different drive mechanisms for the pump can be provided. That is, the present invention can be used independently of whether the piston drives are realized by means of a camshaft or a mandrel, for example. Furthermore, in comparison to some prior art disclosures, with the present invention, there is no necessity for a cooling phase as an additional conveying phase of the pump. The present invention can be used independently of whether the piston drives are dependent or independent of each other. The present invention can be used independently of whether the pistons of the drive are used in parallel or in series. Further still, a synchronization of two or more drives of a high-pressure gradient pump is no longer necessary because the measurement values of the drives can always be selectively matched and the system pressure applies in the same manner to all drives. There is also no more need for a pump cycle with an adjustable size because the periodic flow error no longer occurs. The value of the pressure can be determined based on the force that acts on the piston, with the value of the force then serving as an input parameter in the calculation of the correction variable. That is, the force that acts on the piston can be used as a measure for the pressure. The value of the pressure can also be determined based on the winding current of the drive motor, with the value of the current then serving as an input parameter in the calculation of the correction variable. That is, the winding current of the drive motor can be used as a measure for the pressure. In some embodiment, the flow of the drive is not determined by the input values but is rather measured with a sensor, with the value of the measured flow then serving as an input parameter in the calculation of the correction variable. That is, different parameter can be used as measures for the flow: Either the measured flow or the flow the pump is intended to deliver. If the liquid is known, the pressure can be inferred from the specified compressed volume, with the value of the pressure then serving as an input parameter in the calculation of the correction variable. The value of the pressure can be determined based on the strain of a pressurized structural component, with the strain of the structural component then serving as an input parameter in the calculation of the correction variable. All these modifications are possible without departing from the scope of the present invention.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

What is claimed is:

1. A method of operating a pump generating a flow of a fluid with a pressure, the method comprising:
    operating the pump with a pump speed S satisfying the equation $$S = S_{simple}(1+COR(t));$$

wherein S is the pump speed, $S_{simple}$ is the pump speed without correcting for a compression or an expansion of the fluid, t is a time, and COR(t) is a time dependent correction function;
    wherein the time dependent correction function COR(t) comprises a product of a corrective amplitude $A_{cor}$ and a time dependent function f(t); the method further comprising:
    calculating the corrective amplitude $A_{cor}$ based on a measure of the flow of the fluid and a measure of the pressure of the fluid.

2. The method of claim 1, wherein the calculating the corrective amplitude $A_{cor}$ is based on a quotient of the measure of the pressure and the measure of the flow.

3. The method of claim 1, wherein the corrective amplitude $A_{cor}$ is proportional to the measure of the pressure and is inversely proportional to the measure of the flow.

4. The method of claim 1 further comprising:
    moving a piston in a working head during a pre-compression phase where the pressure reaches a system pressure,
    wherein the corrective amplitude $A_{cor}$ is an equation comprising:

$$A_{cor} = \gamma \cdot \frac{p}{F}$$

where γ is a constant, p is the measure of the pressure of the fluid is at an end of the pre-compression phase, and F is the measure of the flow of the fluid.

5. The method claim 4 further comprising:
    flowing the fluid at a test flow and at a test pressure, wherein the test flow ranges from 1 µl/min to 10000 µl/min and the test pressure ranges from 50 to 1500 bar;
    determining the corrective amplitude $A_{cor}$ that minimizes flow error based on the test flow and the test pressure;
    determining the constant γ based on the test flow, the test pressure and the corrective amplitude $A_{cor}$.

6. The method claim 4 further comprising:
    flowing the fluid at a test flow and at a test pressure, wherein the test flow ranges from 10 µl/min to 1200 µl/min and the test pressure ranges from 50 to 700 bar;
    determining the corrective amplitude $A_{cor}$ that minimizes flow error based on the test flow and the test pressure;
    determining the constant γ based on the test flow, the test pressure and the corrective amplitude $A_{cor}$.

7. The method of claim 1, wherein the measure of the pressure is based on a current for driving a motor of the pump.

8. The method of claim 1, wherein the measure of the pressure is based on a compressibility of the fluid and a compression of the fluid.

9. The method of claim 1, wherein the measure of the pressure is based on a strain of a structure subjected to the pressure.

10. The method of claim 4 further comprises:
receiving the constant at the pump for the time dependent correction function COR(t) from an external unit.

11. The method of claim 4 further comprises:
performing a calibration run with the external unit to obtain the constant; and
sending the constant from the external unit to the pump.

12. The method of claim 1, in which the time dependent function f(t) is an equation comprising:

$$f(t) = \exp\left(-\frac{t}{\tau}\right)$$

at least for $t \leq \tau$, wherein $\tau$ is a time constant.

13. A high pressure liquid chromatography system comprising:
a pump configured to generate a flow of a fluid with a pressure, the pump comprising a controller configured to
a) operate the pump with a pump speed S satisfying the equation $S = S_{simple}(1 + COR(t));$ wherein S is the pump speed, $S_{simple}$ is the pump speed without correcting for a compression or an expansion of the fluid, t is a time, and COR(t) is a time dependent correction function,
wherein the time dependent correction function COR(t) comprises a product of a corrective amplitude $A_{cor}$ and a time dependent function f(t); and
b) calculate the corrective amplitude $A_{cor}$ based on a measure of the flow of the fluid and a measure of the pressure of the fluid.

14. The high pressure liquid chromatography system of claim 13, wherein the corrective amplitude $A_{cor}$ is based on a quotient of the measure of the pressure and the measure of the flow measurement.

15. The high pressure liquid chromatography system of claim 13, wherein the corrective amplitude $A_{cor}$ is an equation comprising:

$$A_{cor} = \gamma \cdot \frac{p}{F}$$

where $\gamma$ is a constant, p is the measure of the pressure of the fluid is at an end of the pre-compression phase, and F is the measure of the flow of the fluid.

16. The high pressure liquid chromatography system of claim 13, in which the time dependent function f(t) is an equation comprising:

$$f(t) = \exp\left(-\frac{t}{\tau}\right)$$

at least for $t \leq \tau$, wherein $\tau$ is a time constant.

* * * * *